United States Patent
Ozaki et al.

(10) Patent No.: US 11,412,087 B2
(45) Date of Patent: Aug. 9, 2022

(54) DIALOGUE SYSTEM

(71) Applicant: NTT DOCOMO, INC., Chiyoda-ku (JP)

(72) Inventors: Yuriko Ozaki, Chiyoda-ku (JP); Takanori Hashimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/286,764

(22) PCT Filed: Jun. 19, 2019

(86) PCT No.: PCT/JP2019/024371
§ 371 (c)(1),
(2) Date: Apr. 19, 2021

(87) PCT Pub. No.: WO2020/090147
PCT Pub. Date: May 7, 2020

(65) Prior Publication Data
US 2021/0377390 A1    Dec. 2, 2021

(30) Foreign Application Priority Data
Oct. 30, 2018   (JP) .............................. JP2018-203684

(51) Int. Cl.
*H04M 3/00*    (2006.01)
*H04M 3/51*    (2006.01)
*H04L 51/02*   (2022.01)
*H04M 3/523*   (2006.01)

(52) U.S. Cl.
CPC .......... *H04M 3/5191* (2013.01); *H04L 51/02* (2013.01); *H04M 3/5233* (2013.01)

(58) Field of Classification Search
CPC .... H04M 3/5191; H04M 3/5233; H04L 51/02
See application file for complete search history.

(56) References Cited

U.S. PATENT DOCUMENTS

2018/0143973 A1    5/2018   Hambrick et al.

FOREIGN PATENT DOCUMENTS

| JP | 2010-212852 A | 9/2010 |
| JP | 2016-152579 A | 8/2016 |

OTHER PUBLICATIONS

International Preliminary Report on Patentability dated May 14, 2021 in PCT/JP2019/024371 (submitting English translation only), 6 pages.
Office Action dated Apr. 19, 2022 in Japanese Application No. 2020-554755 (w/English translation).
International Search Report dated Jul. 23, 2019 in PCT/JP2019/024371 filed Jun. 19, 2019, 1 page.

*Primary Examiner* — Rasha S Al Aubaidi
(74) *Attorney, Agent, or Firm* — Oblon, McClelland, Maier & Neustadt, L.L.P.

(57) ABSTRACT

A dialogue device of a dialogue system relating to provision of a response to an inquiry from a user terminal includes an input unit that acquires the inquiry from the user terminal, a transmission unit that connects the user terminal and an operator terminal responding to the inquiry in accordance with the inquiry, an output unit that outputs questions for ascertaining details of the inquiry to the user terminal before connection made by the transmission unit, and a determination unit that determines a mode of the questions made by the output unit in accordance with an operating status of the operator terminal that can respond to the inquiry.

5 Claims, 5 Drawing Sheets

*Fig.3*

| CONNECTION CONDITION | REQUIRED TIME | ADDITIONAL SCENARIO NAME |
|---|---|---|
| BREAKDOWN | 1 MINUTE | BREAKDOWN A |
| BREAKDOWN | 2 MINUTES | BREAKDOWN B |
| BREAKDOWN | 3 MINUTES | BREAKDOWN C |
| OPERATION | 1 MINUTE | BREAKDOWN A |
| OPERATION | 2 MINUTES | BREAKDOWN B |
| ⋮ | ⋮ | ⋮ |

TB

DIALOGUE SYSTEM

TECHNICAL FIELD

One aspect of the present invention relates to a dialogue system.

BACKGROUND ART

Conventionally, for example, in call centers and the like, a system in which, after inquiries from users are appropriately distributed to destinations through automatic speech answering, handling using an operator is performed is employed (for example, see Patent Literature 1).

CITATION LIST

Patent Literature

[Patent Literature 1] Japanese Unexamined Patent Publication No. 2010-212852

SUMMARY OF INVENTION

Technical Problem

In recent years, in the system of call centers and the like as described above, introduction of a chatbot performing a dialogue with a user using speech or texts has progressed. By using a chatbot, an appropriate response (or transfer to an operator) can be performed through a dialogue with a user.

Here, when a user is connected to a chatbot, even in a case in which there is a need for transfer to an operator at an early stage, and there is a vacancy in the operation of the operators, a user needs to continue the dialogue until a dialogue sequence between the user and the chatbot ends. In accordance with this, there is concern that a user's handling time will become unnecessarily long. On the other hand, in a case in which a dialogue between a user and a chatbot is shortened for all cases, the dialogue may end at an early stage even in a state in which there are no vacancies in the operation of the operators, and thus, details of an inquiry from the user may not be able to be effectively ascertained using the chatbot. In accordance with this, the number of questions asked of a user by an operator may increase after a vacancy becomes available in the operation of the operators, and there is concern that a user's total handling time may become longer. In accordance with this, there is concern that a user's handling time becomes unnecessarily long. On the other hand, in a case in which a dialogue between a user and a chatbot is shortened for all the cases in common, the dialogue ends at an early stage even in a state in which there is no vacancy in the operation of the operator, and thus, details of an inquiry from the user cannot be effectively perceived using the chatbot. In accordance with this, the number of question items from an operator to a user increases after a vacancy becomes available in the operation of the operator, and there is concern that a user's handling time becomes long as a total.

One aspect of the present invention is in view of the situations described above, and an object thereof is to improve user's satisfaction by shortening a user's handling time.

Solution to Problem

A dialogue system according to one aspect of the present invention is a dialogue system relating to provision of a response to an inquiry from a user, the dialogue system including: an acquisition unit configured to acquire the inquiry from the user; a connection unit configured to connect the user and an operator responding to the inquiry in accordance with the inquiry; an output unit configured to output questions for ascertaining details of the inquiry to the user before connection using the connection unit; and a determination unit configured to determine a mode of the questions made by the output unit in accordance with an operating status of the operator that can respond to the inquiry.

In the dialogue system according to one aspect of the present invention, before the user and the operator are connected in accordance with the inquiry, a question for ascertaining the inquiry is output to the user by the output unit. The mode of the question made by the output unit is determined in accordance with the operating status of the operator. In this way, for example, in a case in which the operator that can respond at an early stage is present, the degree of depth of in-advance questions is set to be low (or in-advance questions are not asked), and the user and the operator are connected at an early stage. In a case in which the operator that can respond at an early stage is not present, a time until the operator is connected is effectively utilized, and questions having a high degree of depth are asked, and the number of question items from the operator after the connection to the operator can be reduced, and a total handling time of the user can be shortened. In other words, according the dialogue system according to one aspect of the present invention, by determining a mode of in-advance questions in accordance with the operating status of the operator, the handling time of the user can be shortened, and user satisfaction can be improved.

The connection unit may determine a connection timing for the user and the operator in accordance with the operating status of the operator that can respond to the inquiry. In this way, for example, only when the operation of the operator is in the vacant state, the user and the operator can be connected and the like, and the standby time of the user (a time in which the user is not connected to the operator and does not accept a question) can be shortened.

The determination unit may determine at least one of details of the questions made by the output unit and the number of the questions in accordance with the operating status. In this way, the mode of questions can be appropriately changed (determined).

The dialogue system further includes: a storage unit configured to store scenario information including a plurality of question scenarios composed of one or a plurality of questions and required time information representing a required time for each of the question scenarios included in the scenario information, and the determination unit may identify a connection time required until the operator becomes connectable to a next user in accordance with the operating status, identify the question scenario of which the required time falls within the connection time by referring to the storage unit, and determine the one or a plurality of questions of the identified question scenario as questions to be asked by the output unit. In this way, by selecting a question scenario falling in the connection time from among a plurality of question scenarios prepared in advance, questions according to the operating status can be asked reliably and simply.

The determination unit may determine the one or a plurality of questions of the question scenario of which the required time is the longest among a plurality of the question scenarios of which required times fall within the connection time as questions to be asked by the output unit. In this way, while the connection time is utilized very effectively, questions having a high degree of depth can be asked, and a handling time of the user after connection to the operator can be appropriately shortened.

The determination unit may estimate a connection time required until the operator becomes connectable to a next user in accordance with questions output by the output unit to the user handled by the operator during operation. Since the handling time of the operator during operation changes in accordance with a degree of depth of questions output by the output unit, the connection time can be estimated with high accuracy by considering the questions output by the output unit.

Advantageous Effects of Invention

According to one aspect of the present invention, by shortening a user's handling time, user's satisfaction can be improved.

BRIEF DESCRIPTION OF DRAWINGS

FIG. 3 is a diagram illustrating an example of a selection scenario table stored in an information DB.

DESCRIPTION OF EMBODIMENTS

Hereinafter, an embodiment of the present invention will be described in detail with reference to the attached drawings. In description of the drawings, the same reference signs will be assigned to the same elements or equivalent elements, and duplicate description will be omitted.

Figure 1:
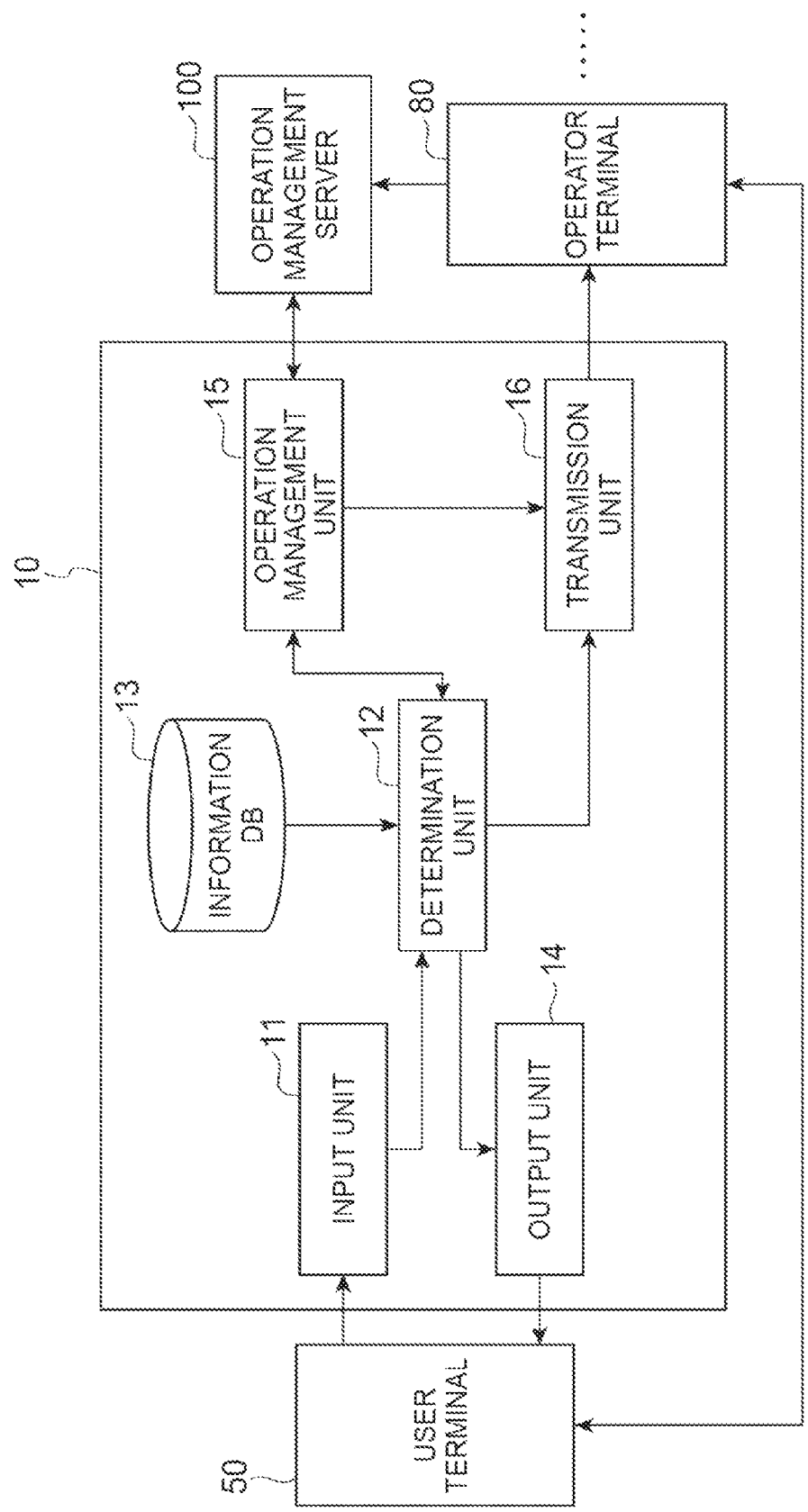
FIG. 1 is a block diagram illustrating a functional configuration of a dialogue device included in a dialogue system according to this embodiment.

FIG. 1 is a block diagram illustrating a functional configuration of a dialogue device 10 included in a dialogue system 1 according to this embodiment. The dialogue system 1 illustrated in FIG. 1 is a system relating to provision of a response to an inquiry from a user terminal 50 (user). In the dialogue system 1, the dialogue device 10 (and an operator terminal 80) performs a dialogue with the user terminal 50 to identify details of the inquiry of user terminal 50, and the operator terminal 80 provides a response to the user terminal 50 in accordance with the details of the inquiry. The user terminal 50 and the operator terminal 80 may be directly connected to each other or may be connected through the dialogue device 10. For example, the dialogue system 1 may be a system that has been introduced into a call center and the like. In this embodiment, the dialogue device 10 receives an incoming call from the user terminal 50, whereby a dialogue between the user terminal 50 and the dialogue device 10 is started. The dialogue system 1 is configured to include the dialogue device 10, a plurality of operator terminals 80, and an operation management server 100. Although the dialogue system 1 is configured to include a plurality of operator terminals 80, and there are also a plurality of user terminals 50 performing dialogue with the dialogue device 10, only one operator terminal 80 and only one user terminal 50 are illustrated in FIG. 1.

The operator terminal 80, for example, is a terminal that is operated by an operator of a call center or the like and provides a response to an inquiry from the user terminal 50 that has been received through the dialogue device 10. The operator terminal 80 provides a response (operator speech) for the user terminal 50, for example, using a phone call.

The operator terminal 80 may provide a response for the user terminal 50, for example, by transmitting a text message or the like to the user terminal 50. The user terminal 50 is a terminal that is able to perform communication and, for example, may be a smartphone, a PC, a tablet terminal, or the like.

The operation management server 100 is a server that manages operating statuses of a plurality of the operator terminals 80. The operation management server 100 manages an operator terminal status and a connection list as the operating statuses. The operator terminal status is information that indicates a status of each operator terminal 80 and may be one of "vacant state", "connecting", and "absent". The "vacant state" is a state in which the corresponding operator terminal 80 can immediately perform handling. "Connecting" is a state in which the corresponding operator terminal 80 is connected to one of the user terminals 50 and is handling the user terminal. "Absent" is a state in which an operator of the corresponding operator terminal 80 is absent. The connection list is information for managing the user terminals 50 for which there has been a connection request from the dialogue device 10 and the operator terminals 80 associated with the user terminals 50 in association with each other. In the connection list, information of each user terminal 50 that is able to be connected immediately owing to the presence of a vacancy in the operator terminals 80 and information of each user terminal 50 that is not connectable at the current time point due to absence of a vacancy in the operator terminals 80 are managed. In addition, in the connection list, a connection time that is a time required for being able to be connected to the associated operator terminal 80 is managed for each user terminal 50. The connection time is regarded as being "0" for the user terminal 50 that can be immediately connected. In a case in which a connection request from the dialogue device 10 is made, the operation management server 100 transmits the connection time to the dialogue device 10. Although a method for estimating a connection time in the operation management server 100 is not limited, for example, the connection time may be estimated by estimating a remaining handling time until being able to handle the user terminal 50 in accordance with a handling time (a time since connection to the user terminal 50) of each operator terminal 80.

The dialogue device 10 is a device that identifies details of an inquiry from the user terminal 50 by performing a dialogue with the user terminal 50. The dialogue device 10 transmits (transfers) the identified details of the inquiry to the operator terminal 80 and enables a response using the operator terminal 80. The dialogue device 10 is a device using a so-called chatbot. Chatbot is a term combining "chat" and "bot" and is an automatic dialogue program that identifies an inquiry from a user while performing a dialogue with the user, for example, utilizing artificial intelligence and the like. In this embodiment, the dialogue device 10 receives an inquiry (a response to a question) from the user terminal 50 by asking the user terminal 50 a question in response to an incoming call from the user terminal 50 and identifies details of the inquiry from the user terminal 50.

As illustrated in FIG. 1, the dialogue device 10 includes an input unit 11 (acquisition unit), a determination unit 12, an information DB 13 (storage unit), an output unit 14, an operation management unit 15, and a transmission unit 16 (connection unit).

The input unit 11, first, receives an incoming call from the user terminal 50. When an incoming call is received, the input unit 11 outputs the incoming call information to the determination unit 12. For example, information such as a telephone number and the like used for identifying the user terminal 50 is included in the incoming call information. When the incoming call information is input, the determination unit 12 outputs a predetermined question (for example, "How can I help you?" or the like) to the output unit 14 by referring to basic scenario BS (see FIG. 2) of the information DB 13, and the output unit 14 outputs the question to the user terminal 50 (details will be described later). Then, an inquiry is output for the question of the output unit 14 from the user terminal 50, and the input unit 11 acquires the inquiry (a response to the question of the output unit 14) from the user terminal 50. The inquiry may be acquired in accordance with the results of voice recognition for speech of the user terminal 50 or may be acquired in accordance with input results (number input results) input at the user terminal 50 in accordance with speech guidance. The voice recognition is performed using a technology that is conventionally known. The voice recognition may be performed by the dialogue device 10, or may be performed by an external device (not illustrated), and the results thereof may be acquired by the dialogue device 10. The number input according to speech guidance may use a technology "Interactive Voice Response (IVR)" that is conventionally known. In a case in which a plurality of questions are defined in the basic scenario BS, the question asking performed by the output unit 14 and the acquisition of an inquiry in the input unit 11 described above may be performed a plurality of times. Then, the input unit 11 outputs details of the inquiry acquired from the user terminal 50 and the inquiry information including the telephone number of the user terminal 50 to the determination unit 12. In addition, in a case in which an additional inquiry (a response to an additional question) has been acquired from the user terminal 50 in accordance with an additional question asked by the output unit 14 to be described later, the input unit 11 also outputs the information to the determination unit 12 as inquiry information.

The operation management unit 15 acquires an operating status of the operator terminal 80 from the operation management server 100 and outputs the operating status to the determination unit 12. In a case in which an operating status acquisition request is input from the determination unit 12, the operation management unit 15 transmits a connection list update request (connection request) to the operation management server 100. Connection conditions (details will be described later) included in the operating status acquisition request and the telephone number of the user terminal 50 are included in the connection list update request. When the connection list update request is received from the operation management unit 15, the operation management server 100 identifies one or a plurality of operator terminals 80 (the operator terminals 80 matching the connection conditions) that can respond to the inquiry on the basis of the connection conditions included in the connection list update request. Then, the operation management server 100 judges whether or not the operator terminal 80 that can respond to the inquiry and is in the "vacant state" is present by referring to the operator terminal status. In this way, when operations are checked, only the operations of the operator terminals 80 matching the connection conditions identified by the dialogue device 10 are checked. In a case in which the operator terminal 80 that is in the "vacant state" is present, the operation management server 100 manages the user terminal 50 and the operator terminal 80 that is in the "vacant state" in association with each other in the connection list. In a case in which the operator terminal 80 that is in the "vacant state" is not present, the operation management server 100 associates the user terminal 50 and the operator terminal 80 during "connecting" with each other in the connection list and manages a connection time required until the user terminal 50 becomes connectable. The operation management server 100 transmits an operation checking result to the dialogue device 10 (in more detail, the operation management unit 15). Information representing the operator terminal 80 to be connected and the connection time (in a case in which immediate connection is available, the connection time is regarded as being "0") are included in the operation checking result. The operation management unit 15 outputs the operation checking result to the determination unit 12 and the transmission unit 16.

When an input of incoming call information is received from the input unit 11, the determination unit 12 refers to the basic scenario BS of the information DB 13 and determines one or a plurality of questions defined in the basic scenario BS as questions to be asked by the output unit 14. Then, the determination unit 12 outputs a basic question instruction including one or a plurality of questions according to the incoming call information to the output unit 14.

The determination unit 12 determines a mode of an additional question to be asked by the output unit 14 in accordance with the operating status of the operator terminal 80 that can respond to the inquiry. The determination unit 12 identifies connection conditions of the user terminal 50 on the basis of the inquiry information input from the input unit 11. The connection conditions represent information that indicates a general condition of an inquiry of the user terminal 50 and, for example, is breakdown (breakdown of the terminal or the like), an operation (an operation of the terminal is not understood or the like), and the like. The determination unit 12 outputs the operating status acquisition request to the operation management unit 15. The connection conditions and the telephone number of the user terminal 50 are included in the operation status acquisition request. Then, the determination unit 12 accepts an input of the operation checking result from the operation management unit 15. As described above, information representing the operator terminal 80 to be connected and the connection time (in a case in which immediate connection is available, for example, the connection time is regarded as being "0") are included in the operation checking result. In addition, in a case in which immediate connection is available, the connection time may not be necessarily "0", and, the availability of immediate connection may be indicated, for example, using arbitrary wording or the like.

Figure 2:
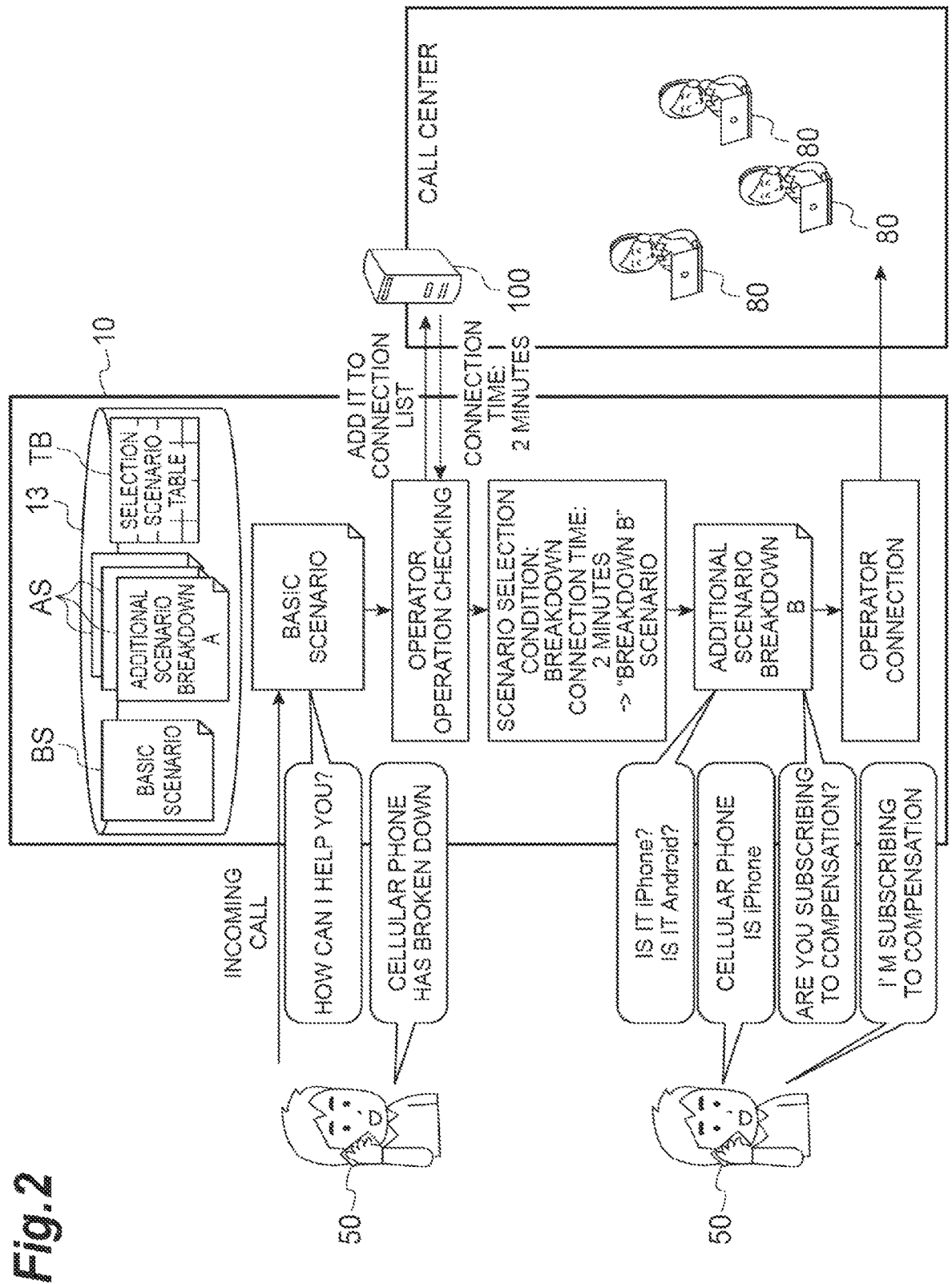
FIG. 2 is a diagram illustrating a question determination processing image according to an operator operation.

The determination unit 12 determines a mode of an additional question asked by the output unit 14 on the basis of the connection time included in the operation checking result and the information stored in the information DB 13. As illustrated in FIG. 2, the information DB 13 stores the basic scenario BS, a plurality of additional scenarios AS (scenario information), and a selection scenario table TB (required time information).

The basic scenario BS is a question scenario composed of one or a plurality of questions and is a question scenario that is necessarily executed as a principle when there is an incoming call from the user terminal 50. In the example illustrated in FIG. 2, an example in which the basic scenario is configured by one question "How can I help you" is illustrated. The additional scenario AS is a question scenario composed of one or a plurality of questions and is a question scenario that is selected by the determination unit 12 in accordance with the connection time (a standby time until the user terminal 50 is connected to the operator terminal 80). The additional scenario AS is an additional question scenario performed in addition to the questions of the basic scenario BS and includes questions for identifying the inquiry from the user terminal 50 in more detail. A plurality of additional scenarios AS are prepared for each connection condition (the breakdown, the operation, or the like) of the inquiry.

The selection scenario table TB is a table that manages a required time for each additional scenario AS. As illustrated in FIG. 3, the selection scenario table TB stores an additional scenario name, a connection condition, and a required time in association with each other. The additional scenario name is a name that uniquely identifies an additional scenario. The connection conditions indicate information that represents a general condition of an inquiry and is a breakdown, an operation, or the like. The required time is a time that is assumed to be necessary for the output unit 14 to ask questions included in the additional scenario.

When an input of an operation checking result is accepted from the operation management unit 15, the determination unit 12 identifies a connection time included in the operation checking result. Then, the determination unit 12 refers to the selection scenario table TB of the information DB and identifies an additional scenario AS which matches the connection conditions of the user terminal 50 and of which a required time falls within the connection time included in the operation checking result. The determination unit 12 determines one or a plurality of questions of the identified additional scenario AS as questions to be asked by the output unit 14. In a case in which a plurality of additional scenarios of which required times fall within the connection time are present, the determination unit 12 may determine one or a plurality of questions of an additional scenario of which the required time is the longest as a question to be asked by the output unit 14. In this way, by selecting one additional scenario from among a plurality of additional scenarios, the determination unit 12 determines at least one of details of the questions and the number of questions to be changeable. In addition, the determination unit 12 may be configured not to necessarily select one additional scenario from among a plurality of additional scenarios and may be configured to simply increase or decrease the number of questions in accordance with the connection time or change predetermined question details in accordance with a connection time. The determination unit 12 outputs an additional question instruction including the selected (determined) one or a plurality of questions to the output unit 14. The determination unit 12 outputs the inquiry information (including an inquiry based on a response to the additional question from the output unit 14) input from the input unit 11 to the transmission unit 16.

In addition, the determination unit 12 may use information of a connection time estimated by the determination unit 12 in place of or in addition to the connection time included in the operation checking result (in other words, the connection time derived by the operation management server 100). The determination unit 12 may identify a question output in the past by the output unit 14 to the user terminal 50 handled by the operator terminal 80 in the "connecting" state (during operation) and estimate a connection time required until the operator terminal 80 becomes connectable to the next user terminal 50 in accordance with the question. Since the handling time of the operator terminal 80 changes in accordance with a degree of in-advance deep drilling-down of the inquiry in the dialogue device (in other words, a degree of depth of the question output by the output unit 14), by estimating the connection time in accordance with the question output by the output unit 14, the connection time can be estimated with higher accuracy.

The output unit 14 outputs a question for ascertaining details of an inquiry of the user terminal 50 to the user terminal 50 before the user terminal 50 is transmitted (connected) to the operator terminal 80 by the transmission unit 16. The question output from the output unit 14 is provided for the user terminal 50, for example, using speech or a text message. The output unit 14 outputs questions according to the basic scenario BS and questions (additional questions) according to the additional scenario AS. When an input of a basic question instruction or an additional question instruction is accepted from the determination unit 12, the output unit 14 outputs one or a plurality of questions included in the question instruction to the user terminal 50.

The transmission unit 16 connects the user terminal 50 and the operator terminal 80 that responds to an inquiry in accordance with the inquiry from the user terminal 50. The transmission unit 16 accepts an input of an operation checking result from the operation management unit 15. The transmission unit 16 determines a connection timing for the user terminal 50 and the operator terminal 80 in accordance with the operation checking result (an operating status of the operator terminal 80 that can respond to the inquiry). In other words, the transmission unit 16 sets a connection time (a standby time until the user terminal 50 is connected to the operator terminal 80) included in the operation checking result as a standby time and determines a timing at which the standby time has elapsed as the connection timing described above. The transmission unit 16 connects the user terminal 50 to the operator terminal 80 at the determined connection timing. In addition, the transmission unit 16 may connect the user terminal 50 to the operator terminal 80 after waiting for an input of all the inquiry information from the determination unit 12 (in other words, waiting for complete end of the additional question from the output unit 14) or may connect the user terminal 50 to the operator terminal 80 only on the basis of the determined connection timing. In the case of connection after waiting for an input of all the inquiry information from the determination unit 12, the number of question items of the operator can be reduced in the operator terminal 80. On the other hand, in the case of connection only based on the determined connection timing, quick connection to the operator terminal 80 can be performed, and a user's burden can be reduced. The transmission unit 16 transmits inquiry information to the operator terminal 80. An operator of the operator terminal 80 responds to the user terminal 50 on the basis of the acquired inquiry information.

A question determination processing image according to an operator operation will be described with reference to FIG. 2. First, when there is an incoming call from the user terminal 50, the dialogue device 10 outputs a predetermined question (for example, "How can I help you?") to the user terminal 50 in accordance with the basic scenario BS. Then, from a response (for example, "A cellular phone is broken") of the user terminal 50 to the question, the dialogue device 10 perceives general details of the inquiry (the cellular phone is broken). Subsequently, in order to check the operating status of the operator terminal 80, the dialogue device 10 transmits a connection request (connection list update request) to the operation management server 100.

The operation management server 100 checks the operating status of the operator terminal 80 and transmits an operation checking result to the dialogue device 10. In the example illustrated in FIG. 2, an operation checking result representing that there is no vacancy in the operator terminal 80 to be connected, and the connection time is regarded as being two minutes is transmitted to the dialogue device 10. The dialogue device 10 selects scenario "breakdown B" from the selection scenario table TB (see FIG. 3) of the information DB as an additional scenario using the condition that the connection conditions represent breakdown, and the connection time is two minutes. Then, the dialogue device 10 asks a question "Is your cellular phone iPhone or Android?" as a question included in the scenario "breakdown B" and acquires a response of "The cellular phone is iPhone" from the user terminal 50, and asks a question "Are you subscribing to a compensation?" and acquires a response "I'm subscribing to the compensation" from the user terminal 50. Finally, the dialogue device 10 makes a connection to the operator terminal 80. Thereafter, the operator of the operator terminal 80 responds to the user terminal 50 on the basis of the acquired inquiry information.

Figure 4:
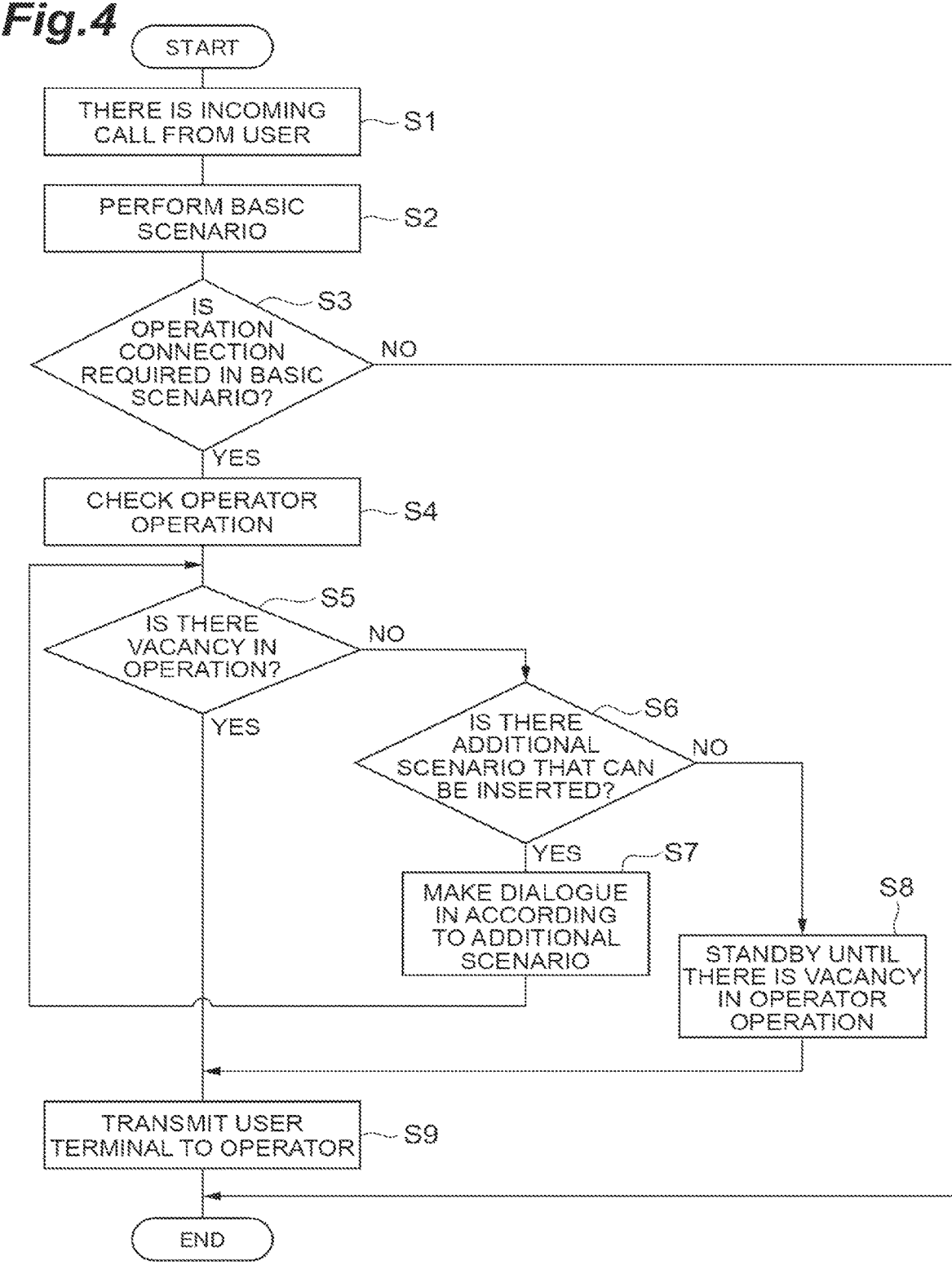
FIG. 4 is a flowchart illustrating a process performed by the dialogue device.

Next, a process performed by the dialogue device 10 will be described with reference to a flowchart illustrated in FIG. 4. FIG. 4 is a flowchart illustrating the process performed by the dialogue device 10.

As illustrated in FIG. 4, when there is an incoming call from the user terminal 50 (Step S1), the dialogue device 10 asks the user terminal 50 a question according to the basic scenario BS (Step S2). More specifically, the output unit 14 asks the user terminal 50 question according to the basic scenario BS (a question determined in accordance with the basic scenario BS by the determination unit 12), and the input unit 11 acquires a response to the question as an inquiry of the user terminal 50. The input unit 11 outputs the inquiry information of the user terminal 50 acquired in accordance with the basic scenario BS to the determination unit 12.

Subsequently, the determination unit 12 judges whether or not the inquiry is an inquiry for a connection to the operator terminal 80 on the basis of the inquiry information acquired in accordance with the basic scenario (Step S3). In Step S3, in a case in which it is judged that connection to the operator terminal 80 is unnecessary, the process ends. On the other hand, in a case in which it is judged that connection to the operator terminal 80 is necessary in Step S3, the dialogue device 10 checks the operating status of the operator terminal 80 (Step S4). More specifically, the determination unit 12 outputs an operating status acquisition request to the operation management unit 15, and the operation management unit 15 transmits a connection list update request to the operation management server 100. Then, the operation management server 100 transmits an operation checking result to the dialogue device 10 (in more detail, the operation management unit 15). The information representing the operator terminal 80 to be connected and a connection time (in a case in which immediate connection is available, the connection time is regarded as being "0") are included in the operation checking result. The operation management unit 15 outputs the operation checking result to the determination unit 12 and the transmission unit 16.

Subsequently, the determination unit 12 judges whether or not the operator terminal 80 that is in the "vacant state" (an operation is vacant) is present on the basis of the connection time included in the operation checking result (Step S5). In a case in which the connection time is "0", the determination unit 12 judges that the operator terminal 80 in the "vacant state" is present. In a case in which it is judged that the operator terminal 80 in the "vacant state" is present in Step S5, the transmission unit 16 immediately transmits (connects) the user terminal 50 to the operator terminal 80 (Step S9).

On the other hand, in a case in which it is judged that the operator terminal 80 in the "vacant state" is not present in Step S5, the determination unit 12 judges whether or not an additional scenario AS for further deep drilling-down of the inquiry information of the user terminal 50 can be inserted (Step S6). More specifically, the determination unit 12 refers to the selection scenario table TB and judges whether or not there is an additional scenario AS which matches the connection conditions of the user terminal 50 and of which a required time falls within the connection time included in the connection time included in the operation checking result.

In a case in which it is judged that the additional scenario AS cannot be inserted in Step S6, the transmission unit 16 stands by until there is vacancy in the operation of the operator (in other words until the connection time elapses) (Step S8) and thereafter transmits (connects) the user terminal 50 to the operator terminal 80 (Step S9). On the other hand, in a case in which it is judged that an additional scenario AS can be inserted in Step S6, the determination unit 12 identifies an additional scenario AS of which a required time falls within the connection time, and the output unit 14 asks the user terminal 50 a question according to the identified additional scenario AS (Step S7). Thereafter, the process of Step S5 is performed again (in other words, it is judged whether or not the operator terminal 80 is in the "vacant state" in accordance with an elapse of the connection time). In the case of the "vacant state", the transmission unit 16 immediately transmits (connects) the user terminal 50 to the operator terminal 80 (Step S9). In the case of no "vacant state", the process of Step S6 is performed again.

Next, operations and effects of the dialogue system 1 according to this embodiment will be described.

The dialogue device 10 of the dialogue system 1 relating to provision of a response to an inquiry from the user terminal 50 includes the input unit 11 that acquires an inquiry from the user terminal 50, the transmission unit 16 that connects the user terminal 50 and the operator terminal 80 responding to the inquiry in accordance with the inquiry, the output unit 14 that outputs questions for ascertaining details of the inquiry to the user terminal 50 before the connection made by the transmission unit 16, and the determination unit 12 that determines a mode of the questions made by the output unit 14 in accordance with an operating status of the operator terminal 80 that can respond to the inquiry.

In the dialogue system 1 according to this embodiment, before the user terminal 50 and the operator terminal 80 are connected in accordance with the inquiry, a question for ascertaining the inquiry is output to the user terminal 50 by the output unit 14. The mode of the question made by the output unit 14 is determined in accordance with the operating status of the operator terminal 80. In this way, for example, in a case in which the operator terminal 80 that can respond at an early stage is not present, the degree of depth of in-advance questions is set to be low (a response time to questions made by the user terminal 50 is shortened), and the user terminal 50 and the operator terminal 80 are connected at an early stage. In a case in which the operator terminal 80 that can respond at an early stage is not present, a time (standby time) until the operator terminal 80 is connected is effectively utilized, and questions having a high degree of depth are asked, and the number of question items from the operator after the connection to the operator terminal 80 can be reduced, and a total handling time of the user terminal 50 can be shortened. In addition, by asking questions having a high degree of depth using the standby time, a handling load (handling time) of the operator terminal 80 can be reduced. In other words, according to the dialogue system 1, by determining a mode of in-advance questions in accordance with the operating status of the operator terminal 80, the handling time of the user terminal 50 can be shortened, and user's satisfaction can be improved. By shortening the handling time of the user terminal 50, a technical effect of reducing the processing load on processing units such as a CPU and the like is also achieved.

The transmission unit 16 determines a connection timing for the user terminal 50 and the operator terminal 80 in accordance with the operating status of the operator that can respond to an inquiry. In accordance with this, for example, only when the operation of the operator terminal 80 is in the vacant state, the user terminal 50 and the operator terminal 80 can be connected and the like, and the standby time of the user terminal 50 (a time in which the user terminal is not connected to the operator terminal 80, and does not accept a question) can be shortened.

The determination unit 12 determines at least one of details of questions made by the output unit 14 and the number of the questions in accordance with the operating status. In this way, the mode of questions can be appropriately changed (determined).

The dialogue system 1 according to this embodiment includes the information DB 13 that stores a plurality of additional scenarios AS configured by one or a plurality of questions and the selection scenario table TB that manages a required time for each additional scenario AS, and the determination unit 12 identifies a connection time required until the operator terminal 80 becomes connectable to the next user terminal 50 in accordance with the operating status and identifies an additional scenario AS of which a required time falls within the connection time by referring to the information DB and determines one or a plurality of questions of the identified additional scenario AS as questions asked by the output unit 14. In this way, by selecting an additional scenario AS falling in the connection time from among a plurality of additional scenarios AS prepared in advance, questions according to the operating status can be asked reliably and simply.

The determination unit 12 determines one or a plurality of questions of the additional scenario AS of which the required time is the longest among a plurality of additional scenarios AS of which required times fall within the connection time as questions to be asked by the output unit 14. In this way, while the connection time is utilized very effectively, questions having a high degree of depth can be asked, and a handling time of the user terminal 50 after connection to the operator terminal 80 can be appropriately shortened.

The determination unit 12 may estimate a connection time required until the operator terminal 80 becomes connectable to the next user terminal 50 in accordance with questions output by the output unit 14 to the user terminal 50 handled by the operator terminal 80 during operation. Since the handling time of the operator terminal 80 during operation changes in accordance with a degree of depth of questions output by the output unit 14, the connection time can be estimated with high accuracy by considering the questions output by the output unit 14.

Figure 5:
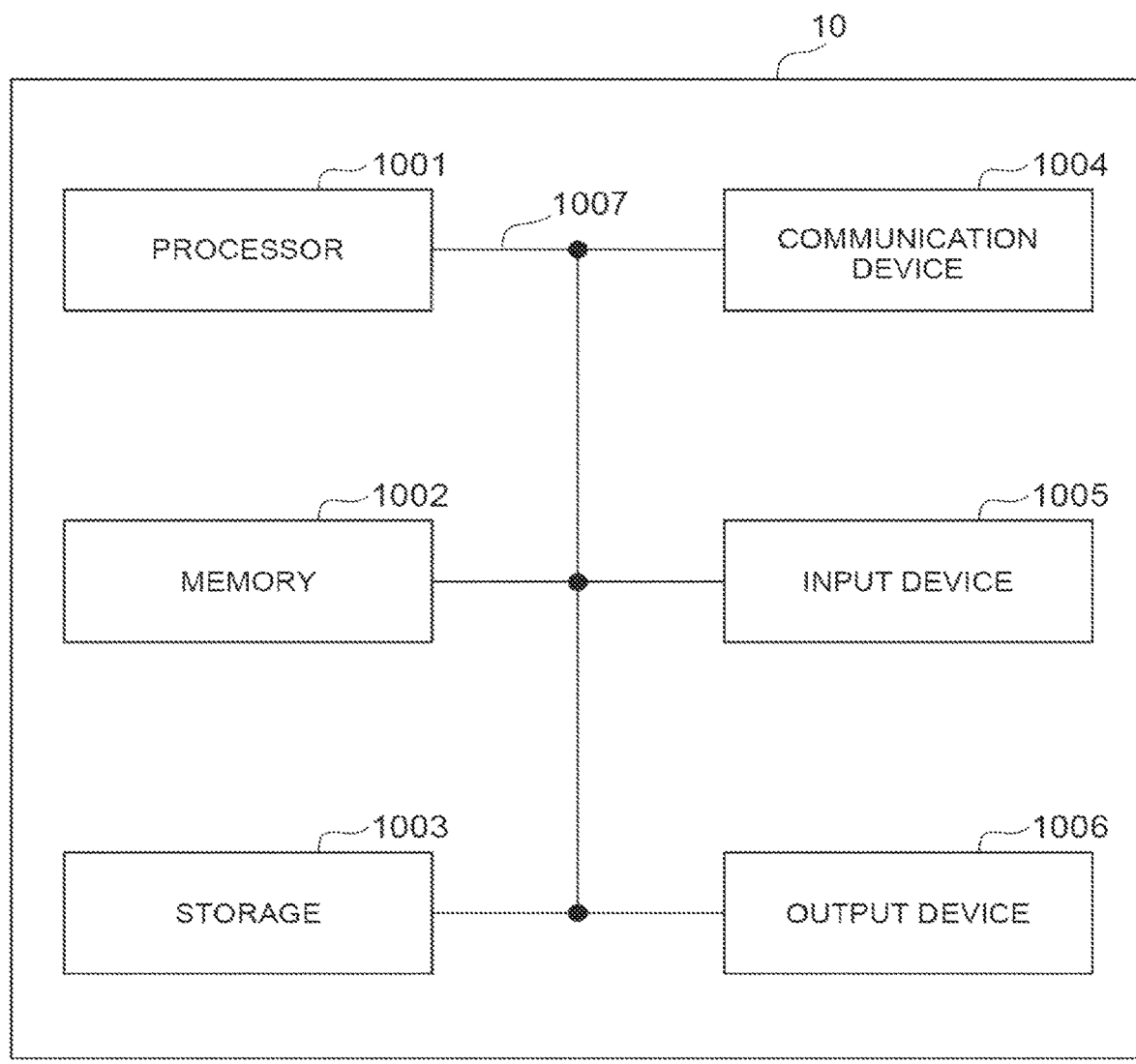
FIG. 5 is a diagram illustrating a hardware configuration of the dialogue device.

Finally, a hardware configuration of the dialogue device 10 included in the dialogue system 1 will be described with reference to FIG. 5. The dialogue device 10 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased with a circuit, a device, a unit, or the like. The hardware configuration of the dialogue device 10 may be configured to include one or a plurality of devices illustrated in the drawing and may be configured without including some devices.

Each function of the dialogue device 10 is realized as the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, a control function of the dialogue device 10 for the determination unit 12 and the like may be realized by the processor 1001.

In addition, the processor 1001 reads a program (a program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, a control function of the dialogue device 10 for the determination unit 12 and the like may be realized by a control program that is stored in the memory 1002 and operated by the processor 1001, and other functional blocks may be similarly realized. Although the various processes described above have been described to be executed by one processor 1001, the processes may be executed simultaneously or sequentially by two or more processors 1001. The processor 1001 may be mounted using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RANI), and the like. The memory 1002 may be referred to as a register, a cache, a main memory (a main storage device), or the like. The memory 1002 can store a program (a program code), a software module, and the like executable for performing a radio communication method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including at least one of the memory 1002 and a storage 1003, a server, or any other appropriate medium.

The communication device 1004 is hardware (a transmission/reception device) for performing inter-computer communication through at least one of a wired network and a wireless network and, for example, may be called also as a network device, a network controller, a network card, a communication module, or the like.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the dialogue device 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

As above, while this embodiment has been described in detail, it is apparent to a person skilled in the art that this embodiment is not limited to the embodiments described in this specification. This embodiment may be performed as a modified or changed form without departing from the concept and the scope of the present invention set in accordance with the claims. Thus, the description presented in this specification is for the purpose of exemplary description and does not have any limited meaning for this embodiment.

Each aspect/embodiment described in this specification may be applied to the long term evolution (LTE), the LTE-advanced (LTE-A), the Super 3G, the IMT-advanced, the 4th generation mobile communication system (4G), the 5th generation mobile communication system (5G), the future ratio access (FRA), W-CDMA (registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), a system using another appropriate system and/or a next generation system extended based on these.

The processing sequence, the sequence, the flowchart, and the like of each aspect/embodiment described in this specification may be changed in order as long as there is no contradiction. For example, in a method described in this specification, elements of various steps are presented in an exemplary order, and the method is not limited to the presented specific order.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in this specification may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wiring technology such as a coaxial cable, an optical fiber cable, a twisted pair, a digital subscriber line (DSL) or the like and a radio technology such as infrared rays, radio waves, microwaves, or the like, at least one of such a wiring technology and a radio technology is included in the definition of the transmission medium.

Information, information, a signal, and the like described in this specification may be represented using any one among other various technologies. For example, data, an instruction, an order, a command, information, a signal, a bit, a symbol, a chip, and the like described over the entire description presented above may be represented using a voltage, a current, radio waves, a magnetic field or magnetic particles, an optical field or photons, or an arbitrary combination thereof.

In addition, a term described in this specification and/or a term that is necessary for understanding this specification may be substituted with terms having the same meaning or a meaning similar thereto.

In addition, information, a parameter, and the like described in this specification may be represented using absolute values, relative values from predetermined values, or other corresponding information.

A user terminal may be called as a mobile communication terminal, a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a hand set, a user agent, a mobile client, a client, or any other appropriate term by persons skilled in the art.

Terms such as "determining" used in this specification may include various operations of various types. The "determining," for example, may include a case in which calculating, computing, processing, deriving, investigating, looking up (for example, looking up a table, a database, or any other data structure), or ascertaining is regarded as "determining" In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining" In other words, "determining" includes a case in which a certain operation is regarded as "determining."

Description of "on the basis of" used in this specification does not mean "only on the basis of" unless otherwise mentioned. In other words, description of "on the basis of" means both "only on the basis of" and "at least on the basis of."

In this specification, in a case in which names such as "first", "second", and the like is used, referring to each element does not generally limit the amount or the order of such an element. Such names may be used in this specification as a convenient way for distinguishing two or more elements from each other. Accordingly, referring to the first and second elements does not mean that only the two elements are employed therein or the first element precedes the second element in a certain form.

In a case in which "include," "including," and modifications thereof are used in this specification or the claims, such terms are intended to be inclusive like a term "comprising." In addition, a term "or" used in this specification or the claims is intended to be not exclusive OR.

In this specification, other than a case in which clearly only one device is present in a context or technically, a device includes a plurality of devices.

In the entirety of the present disclosure, unless a singularity is represented clearly from the context, it includes a plurality thereof.

REFERENCE SIGNS LIST

1 Dialogue system
10 Dialogue device
11 Input unit (acquisition unit)
12 Determination unit
13 Information DB (storage unit)
14 Output unit
16 Transmission unit (connection unit)
50 User terminal (user)
80 Operator terminal (operator)

The invention claimed is:

1. A dialogue system relating to provision of a response to an inquiry from a user, the dialogue system comprising:
an acquisition unit configured to acquire the inquiry from the user;
a connection unit configured to connect the user and an operator responding to the inquiry in accordance with the inquiry;
an output unit configured to output questions for ascertaining details of the inquiry to the user before connection using the connection unit;
a determination unit configured to determine a mode of the questions made by the output unit in accordance with an operating status of the operator that can respond to the inquiry; and
a storage unit configured to store scenario information including a plurality of question scenarios composed of one or a plurality of questions and required time information representing a required time for each of the question scenarios included in the scenario information,
wherein the determination unit identifies a connection time required until the operator becomes connectable to a next user in accordance with the operating status, identifies the question scenario of which the required time falls within the connection time by referring to the storage unit, and determines the one or a plurality of questions of the identified question scenario as questions to be asked by the output unit.

2. The dialogue system according to claim 1, wherein the connection unit determines a connection timing for the user and the operator in accordance with the operating status of the operator that can respond to the inquiry.

3. The dialogue system according to claim 1, wherein the determination unit determines at least one of details of the questions made by the output unit and the number of the questions in accordance with the operating status.

4. The dialogue system according to claim 1, wherein the determination unit determines the one or a plurality of questions of the question scenario of which the required time is the longest among a plurality of the question scenarios of which required times fall within the connection time as questions to be asked by the output unit.

5. The dialogue system according to claim 1, wherein the determination unit estimates a connection time required until the operator becomes connectable to a next user in accordance with questions output by the output unit to the user handled by the operator during operation.

* * * * *